United States Patent
Standke

(10) Patent No.: US 7,789,188 B2
(45) Date of Patent: Sep. 7, 2010

(54) SHAFT HEAD

(75) Inventor: Kurt Standke, Bonn (DE)

(73) Assignee: Rema Lipprandt GmbH & Co. KG, Bonn (DE)

( * ) Notice: Subject to any disclaimer, the term of this patent is extended or adjusted under 35 U.S.C. 154(b) by 0 days.

(21) Appl. No.: 11/884,646

(22) PCT Filed: Feb. 16, 2006

(86) PCT No.: PCT/EP2006/001408

§ 371 (c)(1),
(2), (4) Date: Sep. 22, 2008

(87) PCT Pub. No.: WO2006/089680

PCT Pub. Date: Aug. 31, 2006

(65) Prior Publication Data

US 2009/0205898 A1  Aug. 20, 2009

(30) Foreign Application Priority Data

Feb. 25, 2005  (DE) .................. 20 2005 003 076 U

(51) Int. Cl.
*B62D 51/04* (2006.01)
*B66F 9/24* (2006.01)
(52) U.S. Cl. ...................... 180/332; 180/315; 180/19.2; 187/222; 324/207.2; 335/207
(58) Field of Classification Search .................. 180/315, 180/332, 333, 19.1, 19.2, 19.3; 200/339; 187/222; 324/207.2, 207.25, 207.26, 207.11; 73/866.1; 335/205, 207
See application file for complete search history.

(56) References Cited

U.S. PATENT DOCUMENTS

| | | | |
|---|---|---|---|
| 3,743,980 A * | 7/1973 | Steiner | 335/205 |
| 5,361,644 A | 11/1994 | Nedele et al. | |
| 5,789,884 A | 8/1998 | Hancock | |
| 6,227,320 B1 | 5/2001 | Eggert et al. | |
| 6,276,485 B1 | 8/2001 | Eriksson et al. | |
| 6,566,619 B2 * | 5/2003 | Gillman et al. | 200/339 |
| 2003/0121183 A1 * | 7/2003 | Lin et al. | 37/348 |
| 2005/0098375 A1 * | 5/2005 | David et al. | 180/333 |

(Continued)

FOREIGN PATENT DOCUMENTS

DE  42 15 547  11/1993

(Continued)

*Primary Examiner*—Ruth Ilan
*Assistant Examiner*—Keith Frisby
(74) *Attorney, Agent, or Firm*—Norman B. Thot

(57) ABSTRACT

A tiller head with a switch arrangement for operating a lifting mechanism of a forklift includes an operating element mounted on the tiller head, where the operating element has an actuator, and a magnetic field sensor operatively connected with the actuator without contact so that the magnetic field sensor's electrical characteristic varies when the operating element is actuated. The actuator includes magnetic field sources arranged on both sides of the magnetic field sensor, the magnetic field sensor and the magnetic field sources being arranged so that magnetic field lines generated by the magnetic field sources pass through the magnetic field sensor. The operating element comprises a rocker switch that pivots about an axis on the tiller head, the rocker switch having a recess which extends transversely to an operating direction defined by the axis and into which the magnetic sensor extends.

15 Claims, 3 Drawing Sheets

U.S. PATENT DOCUMENTS

2005/0150708 A1* 7/2005 Lohmann et al. ............ 180/332
2005/0247508 A1* 11/2005 Gilliland et al. ............ 180/402

FOREIGN PATENT DOCUMENTS

| | | |
|---|---|---|
| DE | 196 23 793 | 3/1998 |
| DE | 200 04 887 | 8/2000 |
| DE | 103 48 642 | 5/2005 |
| EP | 0 894 763 | 2/1999 |
| EP | 1 180 473 | 2/2002 |
| GB | 2 413 375 | 10/2005 |
| JP | 10-134582 A | 5/1998 |

* cited by examiner ained in the tiller head. The rubber gas-

SHAFT HEAD

CROSS REFERENCE TO PRIOR APPLICATIONS

This application is a U.S National Phase application under 35 U.S.C. §371 of International Application No. PCT/EP2006/001408, filed on Feb. 16, 2006 and which claims benefit to German Patent Application No. 20 2005 003 076.7, filed on Feb. 25, 2005. The International Application was published in German on Aug. 31, 2006 as WO 2006/089680 A1 under PCT Article 21(2).

FIELD

The present invention concerns a tiller head with a system for operating the lifting mechanism of a forklift.

BACKGROUND

Walkie forklifts or stackers have a tiller, with which the forklift is steered. The tiller articulates on the mount for the pivoting drive-steer wheel of the forklift. The free end of the tiller is provided with a tiller head, which has operating elements for operating the forklift. These operating elements include a drive control switch and a switch arrangement for operating the lifting mechanism of the forklift.

DE 195 23 921 A1 describes a tiller with a tiller head of the type described above. This tiller head comprises a horn, which is arranged as an extension of the tiller shaft, and rodlike grips, which extend more or less transversely to the horn on both sides of the horn and which are connected with the horn or the tiller by arm sections that are joined to the outer ends of the grips and extend approximately parallel to the horn and by carrier sections connected with the arm sections. The arm sections and carrier sections form a protective yoke with grip recesses. A drive control knob is provided between the grip and the horn and is supported on the horn in a way that allows it to pivot approximately about the axis of the grip. Several push buttons for operating the lifting mechanism of the forklift are arranged on each side of the horn. They are operated by being pushed by the fingers of the operator. The push buttons are mechanically connected with microswitches mounted in the tiller head.

A disadvantage of this tiller head is that the use of the push buttons requires openings in the housing of the tiller head. These openings must be sealed to prevent moisture and contaminants from getting inside the tiller head. The rubber gasket necessary for this purpose is expensive to produce and is also sensitive, since repeated operation can lead to the development of cracks and thus points that are no longer tightly sealed in the areas which are flattened by pressing. Especially if a forklift that has untight points of this description is exposed to rain or is washed with a steam jet cleaner, moisture can get inside the tiller head and destroy electrical components located there.

SUMMARY

An aspect of the present invention is to provide a tiller head that is less sensitive to moisture and dirt and is inexpensive to manufacture.

In an embodiment, the present invention provides a tiller head with a switch arrangement for operating a lifting mechanism of a forklift. The switch arrangement includes an operating element mounted on the tiller head, where the operating element has an actuator, and a magnetic field sensor operatively connected with the actuator without contact so that the magnetic field sensor's electrical characteristic varies when the operating element is actuated. The actuator includes magnetic field sources arranged on both sides of the magnetic field sensor, the magnetic field sensor and the magnetic field sources being arranged so that magnetic field lines generated by the magnetic field sources pass through the magnetic field sensor. The operating element comprises a rocker switch that pivots about an axis on the tiller head, the rocker switch having a recess which extends transversely to an operating direction defined by the axis and into which the magnetic sensor extends.

BRIEF DESCRIPTION OF THE DRAWINGS

The present invention is described in greater detail below on the basis of embodiments and of the drawings in which.

Figure 1:
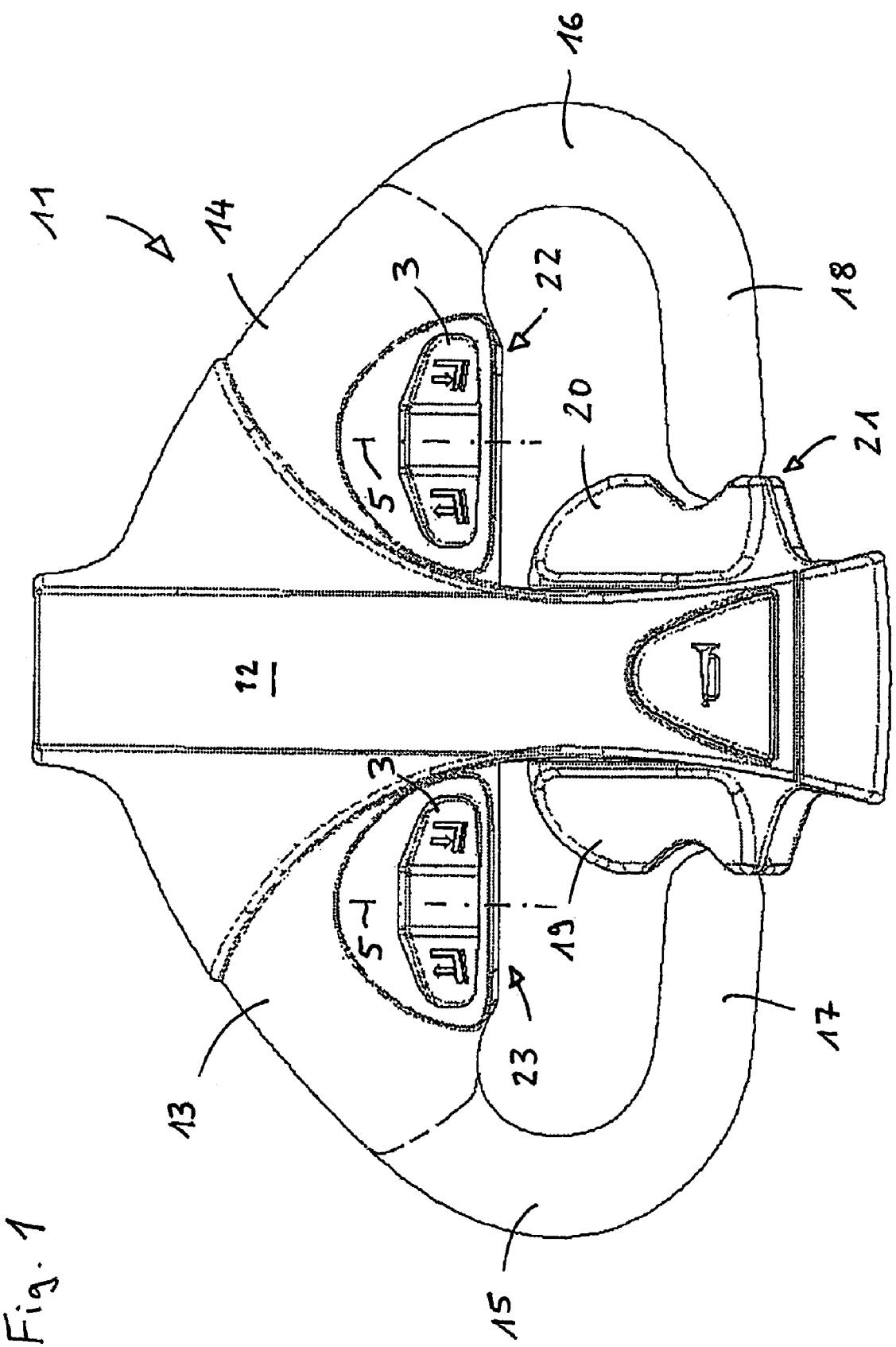
FIG. 1 shows a top view of an embodiment of a tiller head of the present invention.

Due to the fact that, in the tiller head of the present invention, the switch arrangement for operating the lifting mechanism includes an operating element, which is mounted on the tiller head and has an actuator, with which an electrical characteristic of a sensor, such as inductance, capacitance, or electric voltage, can be varied without contact, and that a corresponding sensor is provided, which is operatively connected with the actuator, the actuating signal for operating the lifting mechanism is generated without contact. Therefore, the sensor can be located in a closed housing of the tiller head, and the operating element can be located outside this housing. A completely closed design of the housing of the tiller head is thus possible.

In an embodiment of the present invention, the sensor can be designed as a magnetic field sensor, especially a Hall sensor. Accordingly, the actuator can include at least one magnetic field source. Hall sensors, which generate a Hall voltage, whose magnitude depends on the strength of the magnetic field passing through them, are known in a variety of forms and are commercially available. If the forklift operator actuates the operating element, this changes the strength of the magnetic field at the location of the Hall sensor and thus the Hall voltage, which can be used as a parameter for the given operating state of the lifting mechanism that is desired by the operator.

In an embodiment, the operating element can comprise a rocker switch that pivots about an axis on the tiller head and is, for example, supported on the tiller head by a spring element, whereby then the command "lift" can be triggered, for example, by overcoming the spring force by pushing the rocker switch down on one side out of the neutral position of the rocker switch predetermined by the spring force. To this end, the load side of the Hall sensor can be connected to a microprocessor, which converts the Hall voltage generated as a function of the position of the rocker switch to control signals for actuating the lifting mechanism. The output voltage generated by the Hall sensor when the rocker switch is not being operated would thus be evaluated as a control signal corresponding to the operating state "nonactuation of the lifting mechanism". Consequently, operation of the rocker switch upward on the other side would lead to a change in the output voltage, which the microprocessor would convert to a signal "lower the lifting mechanism".

In an embodiment of the present invention, spring elements are arranged on both sides of the axis. If these spring elements are designed in such a way that they are both in the unstressed state when the rocker switch is in its neutral position, then even the failure of one of the spring elements, for example, by fracture, does not lead to an uncontrolled operating state of the lifting mechanism.

The axis about which the rocker switch is designed to pivot is, for example, aligned in the longitudinal direction of the tiller head. The longitudinal direction is understood to mean the direction transverse to the horn. The rocker switch is then operated in the same direction as the previously known push buttons, so that it is unnecessary to reorient personnel who have become accustomed to conventional tiller heads.

The characteristic of the microprocessor can, for example, be selected in such a way that the sensitivity progressively increases with increasing deflection of the operating element from its neutral position. This measure allows especially sensitive operation of the lifting mechanism at low lifting or lowering speeds. Exact height positioning of a load lifted with the forklift, for example, to set the load down in a high pallet bay, is greatly facilitated by this measure.

In an embodiment of the present invention, the rocker switch has a recess which extends transversely to the operating direction defined by the axis and into which the magnetic sensor extends.

Permanent magnets can then be used as the magnetic field source on both sides of the magnetic sensor. They are mounted more or less in opposite directions, i.e., with like poles more or less facing each other. This measure makes it possible to arrange the Hall sensor more or less centrally between the two permanent magnets with its areal extent approximately perpendicular to the connecting line between the permanent magnets. On the one hand, this measure results in an especially high magnetic field density at the position of the Hall sensor and large changes in the Hall voltage when the rocker switch is operated. On the other hand, so-called SMD technology can be used with the Hall sensor, in which the actual sensor component is placed and mounted directly on the printed circuit board with simultaneous production of the necessary electric contacts. This measure results in greater positioning accuracy of the Hall sensor and greater resistance to mechanical stresses, for example, due to vibrations, compared to arrangements in which the Hall sensor is mounted on the printed circuit board by its electrical contact pins. Furthermore, the arrangement is especially well protected against external interference due to the pattern of magnetic field lines. If a Hall sensor is used which generates a voltage of about 2.5 volts in the unloaded center position of the rocker switch, an increased voltage of up to 5 volts when the rocker switch is operated downward on the side facing the operator, and a reduced Hall voltage with a value close to 1 volt when the rocker switch is operated upward out of its unloaded neutral position on the side facing the operator, then the Hall sensor can be directly connected to the microprocessor without any intermediate amplification stages, which are susceptible to electromagnetic interference.

In an embodiment of the present invention, the microprocessor can be connected with an A/D converter, which outputs the actuating signal as a serial transmission protocol, the signals generated in the tiller head can be transmitted to the power units present in the forklift, such as travel drive, lift drive, etc., by only a few, for example, three cables.

In an embodiment of the tiller head of the present invention that has an especially high degree of operating reliability, units consisting of an actuator and sensor are provided on both sides of the axis of the rocker switch. It is then possible to design and program the microprocessor in such a way that a plausibility check of the signals detected by the sensors always occurs, and the lifting mechanism is shut down as soon as implausible signals that indicate a failure are detected. The operating reliability of the forklift equipped with a tiller head of the present invention is enhanced by this refinement.

The tiller head 11 has a horn 12, which is an extension of the tiller shaft (not shown) and from which support sections 13, 14 extend laterally. Curved regions 15, 16 are mounted on the ends of the support sections 13, 14 and become grips 17, 18 that run more or less perpendicularly to the horn 12. The two connected parts 19, 20 of a drive control switch 21 of a type that in itself is already well known are provided as extensions of the two grips 17, 18. The operator can operate the driving switch 21, for example, with his thumbs.

In addition, switch arrangements 22, 23 for operating the lifting mechanism of a forklift are provided on both sides of the horn 12 of the tiller head 11 in the regions of the support sections 13, 14 that face the operator. Each of the two switch arrangements 22, 23 comprises a rocker switch 3, which can be pivoted about an axis 5 by pressure applied to an end region. Pressure applied to the end regions shown on the left in FIG. 1 produces lifting by the lifting mechanism, and pressure applied to the end regions shown on the right produces lowering.

Figure 2:
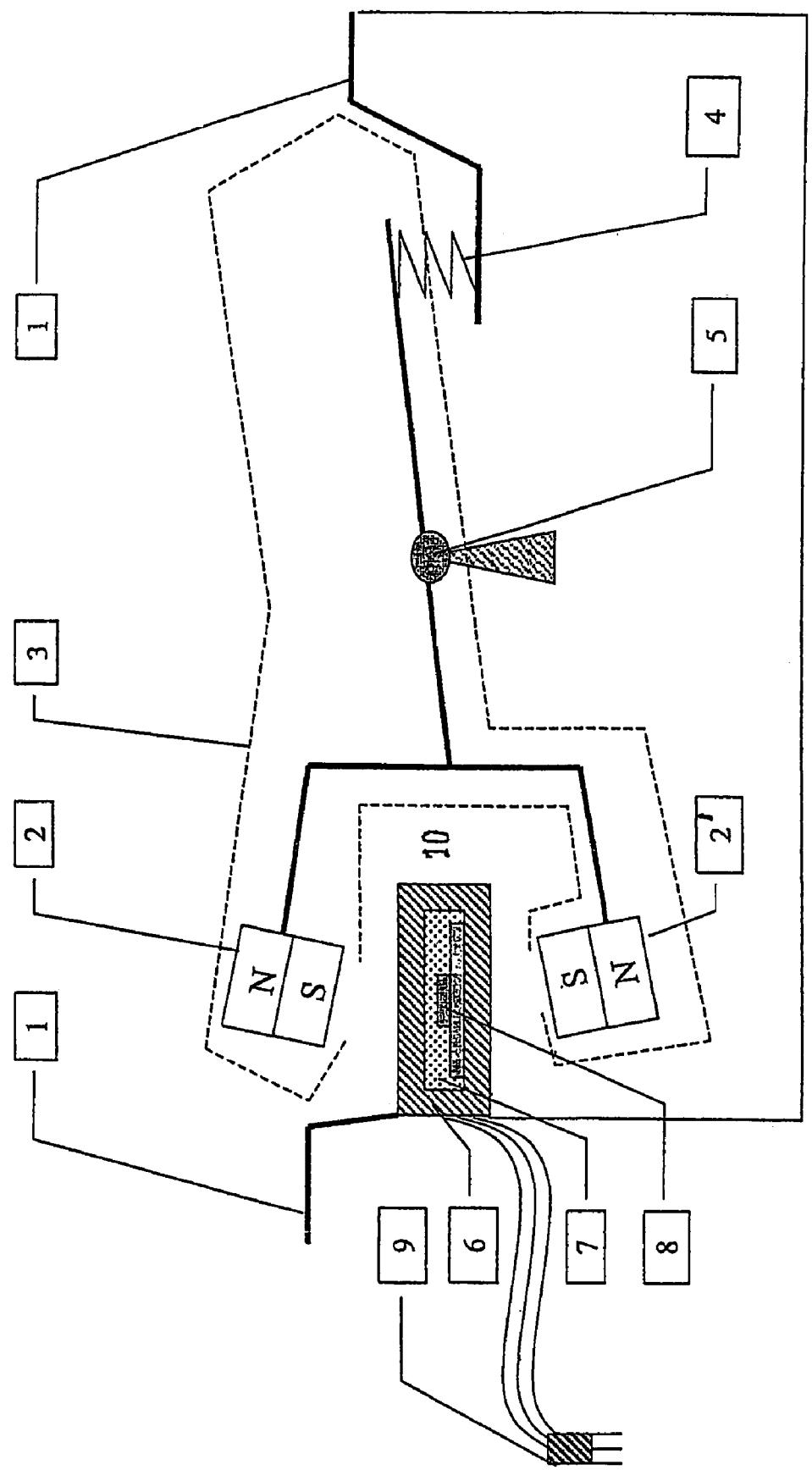
FIG. 2 shows a side view of a partial section of an embodiment of a switch arrangement for operating a lifting mechanism.

One of the two identically designed switch arrangements is shown schematically in FIG. 2. A rocker switch 3, which can pivot about the axis 5, is provided on the closed housing 1 of the tiller head 11. It is supported in the housing 1 by a spring element 4 on its end region that is shown on the right in the drawing.

The end region of the rocker switch 3 that is shown on the left in the drawing is forked in such a way that a recess that extends transversely to the operating direction defined by the axis is formed between the "tines of the fork". A magnetic sensor 7 designed as a Hall sensor 8 extends into this recess. The magnetic sensor 7 is completely enclosed by the housing 1, which for this purpose has a bulging section 6 that extends into the recess 10. A permanent magnet 2, 2' is arranged in each of the end regions of the two "tines" in such a way that the south pole of the upper permanent magnet 2 faces the upper side of the magnetic sensor 7, and the south pole of the lower permanent magnet 2' faces the underside of the magnetic sensor 7.

Figure 3:
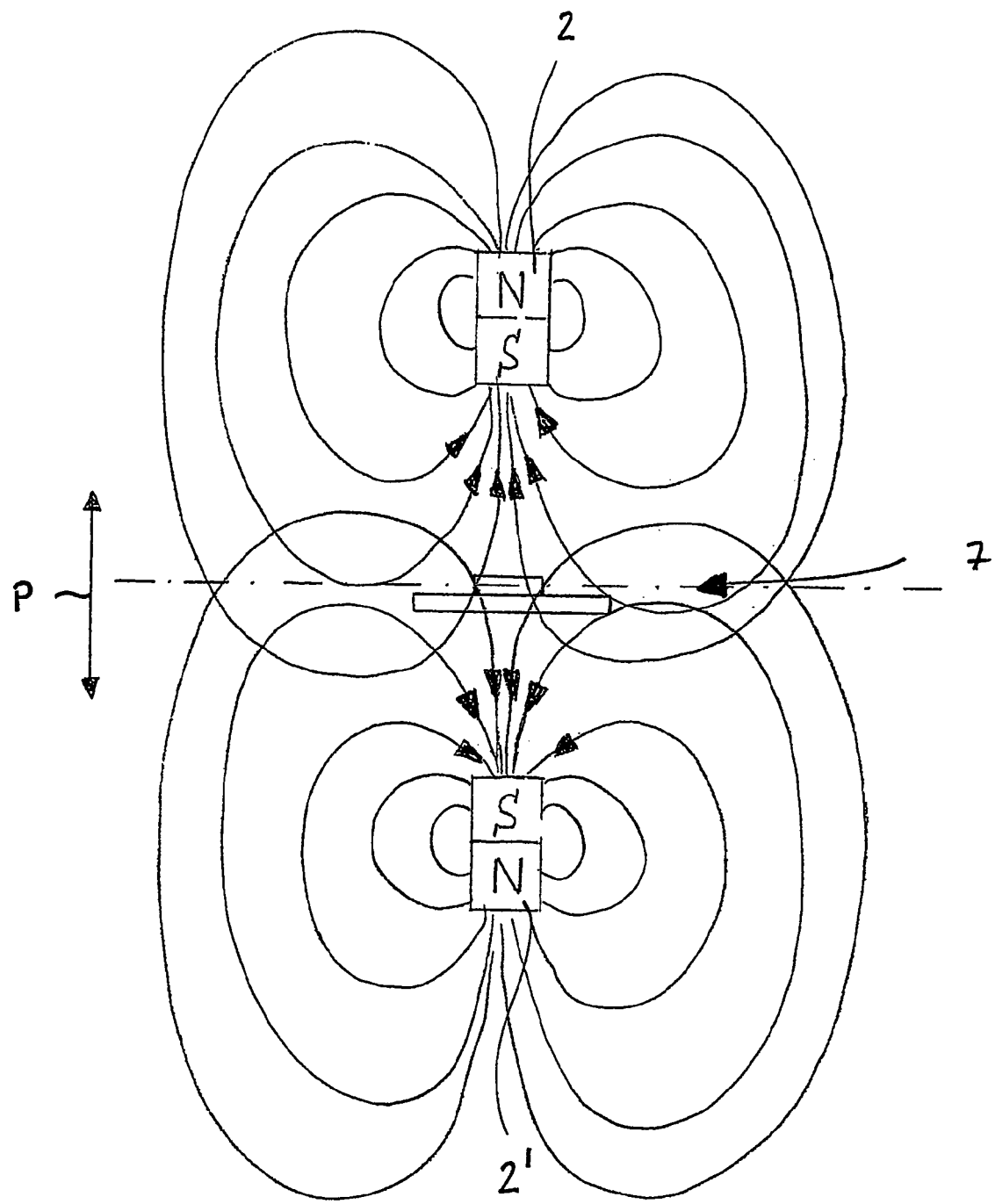
FIG. 3 shows qualitatively—the pattern of magnetic field lines in a switch arrangement according to FIG. 2.

As is apparent from FIG. 3, which qualitatively shows the pattern of magnetic field lines in the rocker switch in the neutral position, magnetic field lines running in opposite directions pass through the magnetic sensor 7 in this position with about the same density. If the rocker switch is then deflected from its neutral position, thereby causing displacement of the permanent magnets in the direction of the double arrow P, the flow of the magnetic field lines of one direction predominates at the location of the sensor, and the signal output by the sensor changes.

The electric signal (in the illustrated embodiment, the Hall voltage) generated by the magnetic sensor as a function of the positions of the two permanent magnets 2, 2' is supplied to a microprocessor 9, which, as a function of this input signal, generates a control signal for driving a lifting mechanism (not shown in the drawing) of the forklift.

The drawing shows the neutral position of the rocker switch 3, which takes this position when the spring element 4 is relaxed. This neutral position generates in the Hall sensor 8 a Hall voltage, which depends on the magnetic field strength and thus on the distance of the two permanent magnets 2, 2' from the corresponding facing side of the Hall sensor. The Hall voltage in this position can be, for example, 2.5 V. If the end of the rocker switch 3 that faces the operator and is shown on the left, in the drawing is moved down, the Hall voltage continuously increases, for example, to as high as 5 V, at which point the end of the rocker switch 3 that faces the operator is located in its low extreme position. The microprocessor 9 is calibrated in such a way that, when a Hall voltage of 2.5 V is present, it delivers to the drive of the lifting mechanism a control signal that causes the drive to shut down. When a Hall voltage of 5 V is present, the drive is driven by the microprocessor 9 at the maximum lifting speed of the lifting mechanism. The intermediate values of the Hall voltage correspond to intermediate values in the lifting speed, and the microprocessor has a progressive characteristic, such that the change in the drive speed increases greater than proportionally with respect to the deflection of the rocker switch 3 from its neutral position.

If the end of the rocker switch that is shown on the right in the drawing is moved down against the elastic force introduced by the spring element, the Hall voltage drops, for example, to 2.5 V, when the end position of the rocker switch is reached.

The microprocessor 9 controls the drive according to the description given above but in the opposite direction, with the result that the lifting mechanism is lowered. To avoid repetition, the reader is referred to the discussion in connection with the operation of the rocker switch to lift the lifting mechanism.

The microprocessor 9 can be mounted on a central printed circuit board (not shown in the drawing). The printed circuit board can also include means for the individual calibration of the switch arrangement, which are necessary for the signal that corresponds to the neutral position of the drive of the lifting mechanism and is supplied to the microprocessor 9 to be adapted to the individual (due to manufacturing tolerances) output voltage of the Hall sensor 8 with the rocker switch 3 in the neutral position. In addition, means for adapting the sensitivity behavior via the switching path of the switch arrangement can be provided on the central printed circuit board. Finally, A/D converters can be provided to convert the output signal of the microprocessor 9 to serial transmission protocols.

The present invention is not limited to embodiments described herein; reference should be had to the appended claims.

LIST OF REFERENCE NUMBERS

1 housing
2 permanent magnet
3 rocker switch
4 spring element
5 axis
6 bulging section
7 magnetic sensor
8 Hall sensor
9 microprocessor
10 recess
11 tiller head
12 horn
13, 14 support sections
15, 16 regions
17, 18 grips
19, 20 parts
21 drive control switch
22, 23 switch arrangements

The invention claimed is:

1. A tiller head with a switch arrangement for operating a lifting mechanism of a forklift, wherein the switch arrangement includes:
   an operating element mounted on the tiller head, where the operating element has an actuator: and
   a magnetic field sensor operatively connected with the actuator without contact so that the magnetic field sensor's electrical characteristic varies when the operating element is actuated,
   wherein, the actuator includes magnetic field sources arranged on both sides of the magnetic field sensor, the magnetic field sensor and the magnetic field sources being arranged so that magnetic field lines generated by the magnetic field sources pass through the magnetic field sensor, and
   wherein the operating element comprises a rocker switch that pivots about an axis on the tiller head, the rocker switch having a recess which extends transversely to an operating direction defined by the axis and into which the magnetic sensor extends.

2. A tiller head as recited in claim 1, wherein the magnetic field sensor is designed as a Hall sensor.

3. A tiller head as recited in claim 1, wherein the axis extends in a longitudinal direction of the tiller head.

4. A tiller head as recited in claim 1, further comprising at least one spring element, wherein the at least one spring element supports the rocker switch on the tiller head.

5. A tiller head as recited in claim 4, wherein spring elements are arranged on each side of the axis.

6. A tiller head as recited in claim 5, wherein each spring element is in the unstressed state when the rocker switch is in a neutral position.

7. A tiller head as recited in claim 1, further comprising permanent magnets arranged on each side of the magnetic field sensor.

8. A tiller head as recited in claim 7, wherein the permanent magnets are mounted so that like poles face each other.

9. A tiller head as recited in claim 1, wherein the magnetic field sensor is connected with a microprocessor, which converts the electrical characteristic of the magnetic field sensor to an actuating signal for the lifting mechanism.

10. A tiller head as recited in claim 9, wherein the microprocessor is connected with an A/D converter, which outputs the actuating signal as a serial transmission protocol, proportionally or as an on/off signal.

11. A tiller head as recited in claim 9, wherein a sensitivity of the microprocessor is selected so as to selectively increase the sensitivity with increasing deflection of the operating element from a neutral position.

12. A tiller head as recited in claim 1, wherein units consisting of the actuator and the magnetic field sensor are provided on each side of the axis of the rocker switch.

13. A tiller head as recited in claim 1, wherein the electrical characteristic is at least one of inductance, capacitance and electric voltage.

14. A tiller head as recited in claim 1, further comprising a housing with a bulging section extending into the recess, wherein the magnetic field sensor is completely enclosed by the housing.

15. A tiller head as recited in claim 1, wherein the switch arrangement is designed so that the rocker switch is in a middle position when the rocker switch is in a neutral position.

* * * * *